June 18, 1946.　　　H. E. MALONE　　　2,402,174

HEATING CONTROL SYSTEM

Filed Dec. 20, 1941　　　3 Sheets-Sheet 1

INVENTOR.
HOMER E. MALONE
BY
ATTORNEY.

June 18, 1946.  H. E. MALONE  2,402,174
HEATING CONTROL SYSTEM
Filed Dec. 20, 1941  3 Sheets-Sheet 2
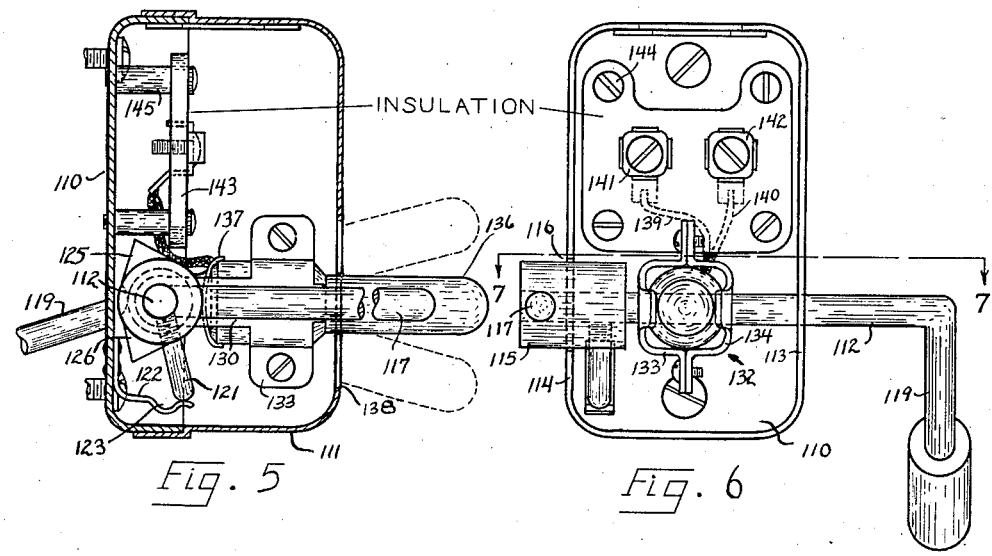
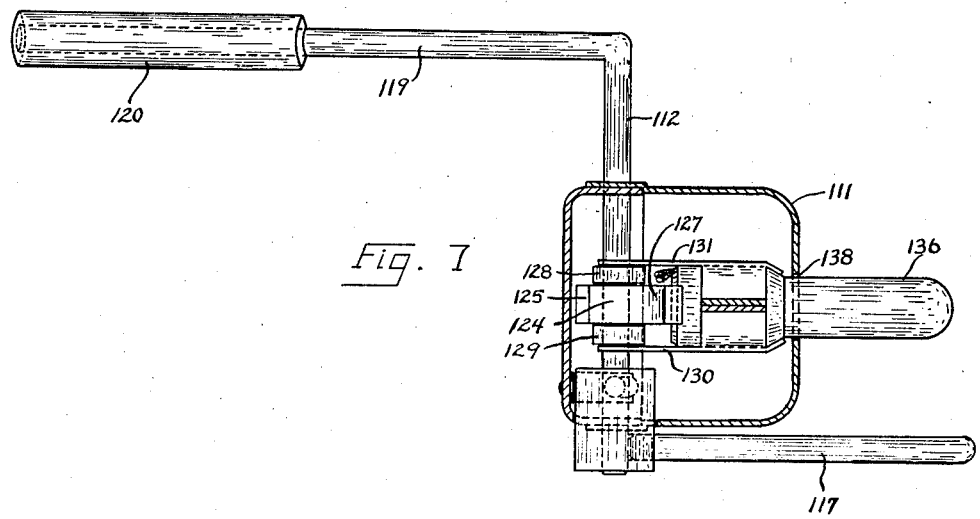
INVENTOR.
HOMER E. MALONE
BY
ATTORNEY.

June 18, 1946.    H. E. MALONE    2,402,174
HEATING CONTROL SYSTEM
Filed Dec. 20, 1941    3 Sheets-Sheet 3
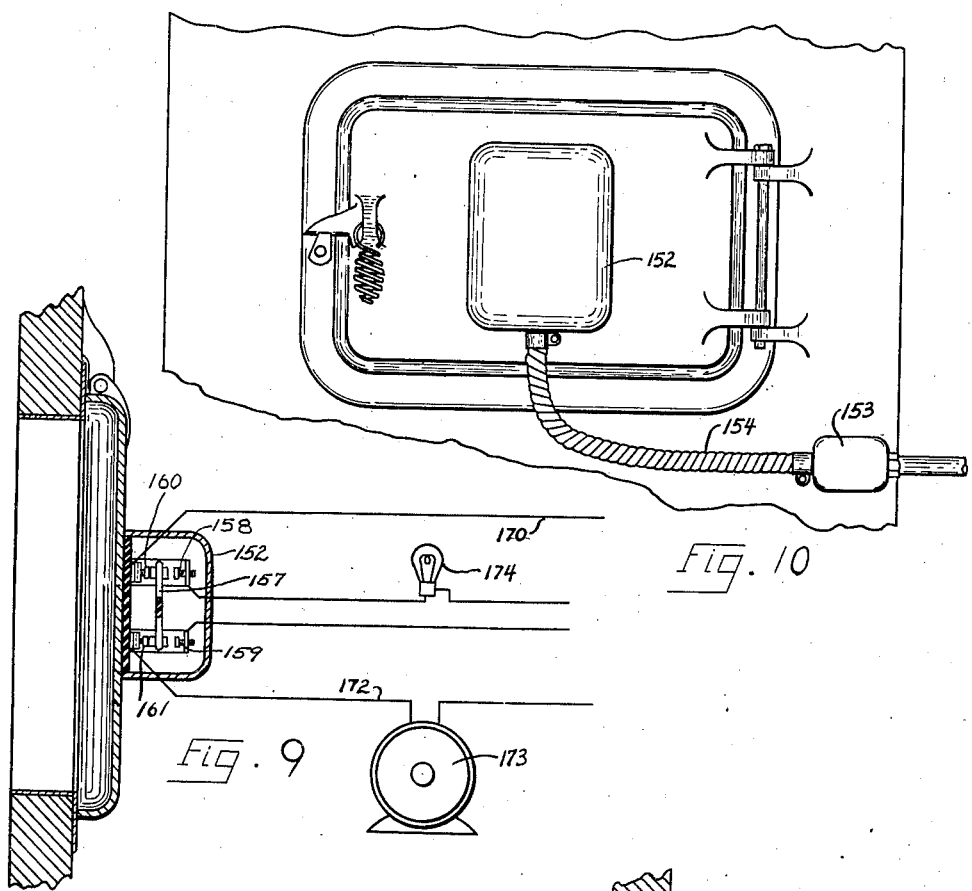
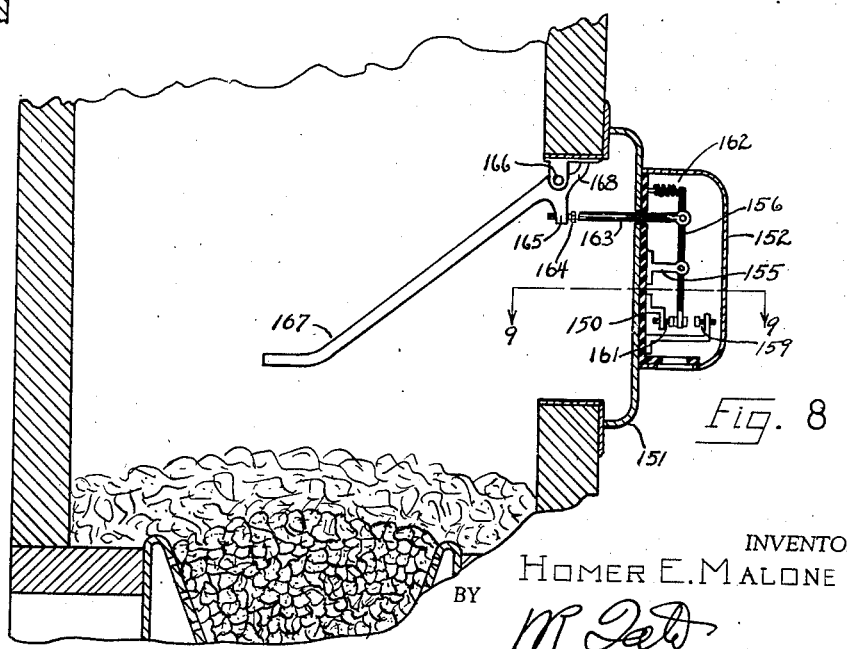
INVENTOR.
HOMER E. MALONE
BY
ATTORNEY.

Patented June 18, 1946

2,402,174

UNITED STATES PATENT OFFICE 2,402,174

HEATING CONTROL SYSTEM

Homer E. Malone, Milwaukee, Wis., assignor to Perfex Corporation, Milwaukee, Wis., a corporation of Wisconsin Application December 20, 1941, Serial No. 423,723

9 Claims. (Cl. 110—101)

This invention relates in general to automatic control for heating systems, and is more particularly concerned with control of solid fuel burner devices.

In domestic heating it has become common to employ automatic stokers as a source of heat. A stoker of this type is usually controlled by means of a room thermostat which serves to start and stop the stoker in a manner to maintain a constant temperature within the building. It has also become common to provide some sort of holdfire device for operating the stoker independently of the room thermostat for keeping the fire alive. In spite of these holdfire devices the fire sometimes goes out. When this occurs and the room thermostat next calls for heat, the stoker will be operated to deliver coal to the retort. Due to the fire being out, this coal merely accumulates within the combustion chamber, with possible injury to the furnace. In any event, this accumulation of unburned coal within the combustion chamber makes rebuilding of the fire a difficult task. In order to avoid the difficulty above mentioned, "outfire" controls have been provided which are intended to prevent operation of the stoker if the fire goes out. Prior to the present invention, this type of control consisted merely of a thermostatic device responsive to the temperature of the gases passing through the stack and arranged to open a switch in the stoker circuit when the stack temperature falls to a point indicating the fire is probably out. The main difficulty with such temperature responsive outfire controls is that of obtaining a proper adjustment. If the control is set to open its switch at too low a temperature, it is possible that the switch will not open until a long time after the fire goes out. On the other hand, if the control is set to open at too high a temperature, it is likely that the switch will open and prevent operation of the stoker, even though a small fire is present. Thus the control, instead of protecting against operation of the stoker without a fire, actually puts the fire out.

The primary object of this invention is to provide a control for a stoker which is simple and dependable in operation and which places the stoker out of operation if the fire should go out. This result is obtained by arranging the outfire control so as to respond to the amount of coal in the combustion chamber. As long as the stoker is functioning properly and combustion is present, the quantity of coal will be relatively low. However, when the fire goes out and the stoker operates, an abnormal amount of coal will accumulate in the combustion chamber. The outfire control of the present invention responds to this abnormal quantity of coal and serves to prevent further operation of the stoker.

An object of the present invention, therefore, is the provision of an outfire control which responds to the quantity of coal in the combustion chamber, and which places the stoker out of operation when this quantity increases to a value indicating that the fire is probably out.

In the preferred embodiment of this invention, the quantity of coal in the combustion chamber is measured by its level within the combustion chamber. While this measurement of coal level may be made in various manners without departing from the invention, this measurement preferably is made by means of a device which overlies the coal in the combustion chamber and which is contacted by the coal and urged upwardly when the coal level rises to a point indicating that the fire is probably out, this upward movement serving to actuate a control device for stopping the stoker.

It is a further object of the invention to provide an arrangement for raising this overlying device for permitting an attendant to work on the first without danger of damage to the device. This feature incidentally provides for stopping of the stoker at this time, and thus dispenses with the necessity of a separate line switch for providing this function.

It is a further object of the invention to provide an arrangement by which the overlying device is held in its raised position when the access door is open and which is returned automatically toward normal position upon closure of the access door.

A further object of the invention consists of the provision of an outfire control of the type generally described which serves to place the stoker out of operation when the access door for the furnace is opened and which automatically renders the stoker operative when the access door is closed.

Further objects of the invention consist of various novel details of construction and will become apparent from the following description and the appended claims.

While the invention is primarily intended as an outfire control for stokers, certain aspects of the invention are of broader application.

For a full disclosure of the present invention, reference is made to the following detailed description and to the accompanying drawings, in which Fig. 1 illustrates diagrammatically a stoker fired heating system having an outfire control of the present invention applied thereto;

Fig. 5 is a side view, partly in section, of another form of the invention;

Fig. 6 is a front view of the embodiment of Fig. 5;

Fig. 7 is a top view, partly in section, of this same embodiment of the invention;

Fig. 8 is a side view partly in section showing still another embodiment of the invention;

Fig. 9 is a top view of the device shown in Fig. 8; and

Fig. 10 is a front view of this same device.

Figure 1:
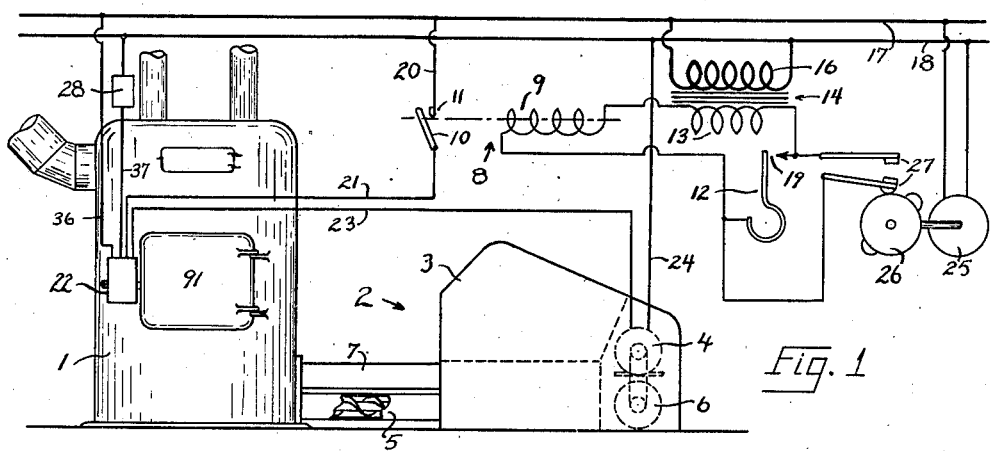

Referring first to Fig. 1, reference character 1 indicates a furnace provided with a stoker 2 which may be of usual construction. Stoker 2 may include a hopper 3 and an electric motor 4 which operates a fuel feeding means or feed screw 5 through suitable mechanism, not shown. This motor 4 also operates an air feeding means or fan 6 which delivers air to the stoker retort through an air duct 7. The motor 4 is controlled by means of a relay generally indicated as 8, this relay having a coil 9 which actuates, through a suitable armature, a switch arm 10 cooperating with a contact 11. This relay may be controlled in accordance with the demand for heat by means of a room thermostat 12 and receives power from the secondary 13 of a transformer 14, this transformer 14 having a primary coil 16 which is connected across line wires 17 and 18. When the room thermostat calls for heat it closes its contacts 19, thus energizing relay coil 9, which causes the switch arm 10 to engage contact 11. This completes a circuit from the line wire 17 through wire 20, switch arm 10 and wire 21 to the outfire control 22, and from control 22 through wire 23 to motor 4 which is connected to line wire 18 by wire 24. The outfire control will be described in detail, and includes a switch which remains closed as long as the level of fuel in the combustion chamber is below a predetermined point. However, if the fire goes out, the coal level builds up in the combustion chamber to a point at which the outfire control 22 breaks the motor circuit, which prevents further operation of the motor.

The control system preferably also includes a suitable "holdfire" control. This control may consist of a timer formed of a synchronous motor 25 which operates a cam 26 for actuating a switch 27 connected in parallel with the thermostat 12.

The control system may also include a suitable alarm 28, such as a light or bell, this alarm being energized by a switch of the outfire control 22 which is moved to closed position when the outfire control breaks the circuit of stoker motor 4.

Figures 2, 3:
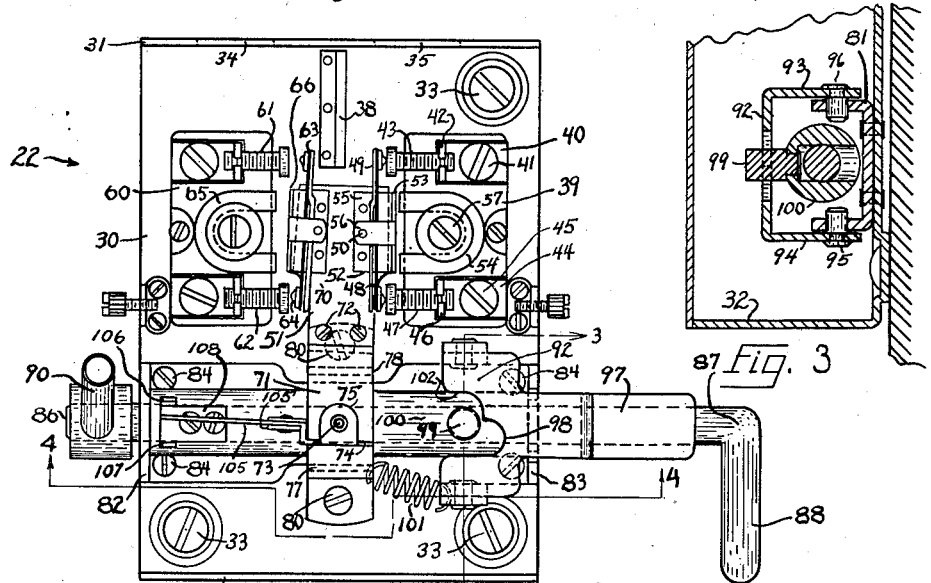
Fig. 2 is an elevation of a preferred form of outfire control with its cover removed.
Fig. 3 is a fragmentary sectional view taken on line 3—3 of Fig. 2.
Figure 4:
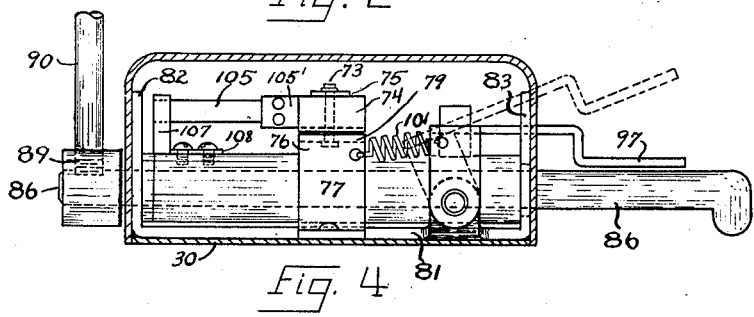
Fig. 4 is a bottom view of the outfire control partially in section, taken along the line 4—4 of Fig. 2.

Referring now to the construction of the outfire control 22, reference is made to Figs. 2, 3 and 4. This control may consist of a base 30 provided with out-turned ears 31 and 32 at its upper and lower ends respectively. This base may be secured to the furnace 1 or to a suitable bracket mounted thereon by means of screws 33. The upper ear or flange 31 is preferably provided with openings 34 and 35 for the reception of suitable electric wiring fittings for the stoker motor wires 21 and 23 and the alarm wires 36 and 37 (Fig. 1). Preferably a barrier 38 is mounted on the base 30 and extends outwardly therefrom so as to prevent improper wiring of the control.

Mounted on the base at the right hand side of barrier 38 is a switch block 39 formed of insulating material. This block is formed to carry an upper terminal bracket 40 having a terminal screw 41 for the attachment of one of the stoker motor wires. This bracket 40 is provided with a turned up portion 42 which receives a contact stud 43. A similar terminal bracket 44 is mounted on the lower end of switch block 39, this terminal bracket having a terminal screw 45 and a turned up portion 46 which receives a second contact stud 47. The contacts 43 and 47 are adapted to be bridged by means of a flexible contact bar 48 which carries a pair of movable contacts, one adapted to engage the fixed contact 43 and the other adapted to engage the fixed contact 47. The flexible contact bar 48 is attached to a rigid bar 49, which bar is pivoted to a pivot pin 50 which is carried by a main switch arm 51. The main switch arm 51 also carries an armature member 52. This armature member consists of a portion 53 which is arranged to cooperate with a permanent magnet 54 mounted on the switch block 39. The portion 53 of the armature member is attached to the main switch arm 51 by an in-turned portion 55 and also carries an ear 56 which extends to the pivot pin 50 for supporting the outer end thereof. The permanent magnet 54 is adjustably secured to the block 39 by means of a screw 57. A second switch block 60 is mounted on the base 30 on the left hand side of barrier 38. This switch block 60 may be identical with the switch block 39 and carries fixed contact studs 61 and 62 which cooperate with movable contacts 63 and 64 carried by the main switch arm 51. The block 60 is also provided with a permanent magnet 65 which cooperates with an armature 66 carried by the main switch arm 51.

From the description thus far it will be apparent that when the switch arm 51 is in the position shown, the fixed contacts 43 and 47 are bridged by the movable contacts and the movable contact arm, the fixed and movable contacts being held in firm engagement by the permanent magnet 54 which attracts armature 53. This bridging of fixed contacts 43 and 47 joins wires 21 and 23 (Fig. 1) and thus permits operation of the stoker. At this time the movable contacts 63 and 64 are disengaged from their respective fixed contacts 61 and 62. Consequently wires 36 and 37 (Fig. 1) are disconnected and the alarm device 28 is deenergized. The position of the main switch arm 51 as shown in Fig. 2 is the normal position for this switch arm, this position permitting operation of the stoker and causing the alarm device 28 to remain deenergized.

Referring now in detail to the main switch arm 51, this arm preferably consists of an upper section 70 of insulating material, this upper section 70 being secured to a lower section 71 by means of screws 72. This lower section 71 of the main switch arm 51 is pivoted to a pivot pin 73. Preferably the lower section 71 is formed of a stamping having a lower portion 74 which extends outwardly, this lower portion 74 supporting an ear 75 which also is pivoted to the pivot pin 73. The pivot pin 73 is supported upon a U- shaped bracket 76, this bracket having spaced legs 77 and 78 (shown dotted), these legs being joined by an intermediate portion 79 (Fig. 4) supporting the pivot pin 73 and lying under the lower portion 71 of the switch arm 51. The legs 77 and 78 are provided with out-turned portions and are secured to the base 30 by screws 80.

Secured to the base 30 near its lower end is a U-shaped bracket 81 having outwardly extending legs 82 and 83. This bracket may be attached to the base 30 by screws 84. The ears 82 and 83 are provided with suitably aligned openings for receiving a shaft 86. This shaft 86 is bent at 87 so as to provide an inwardly extending portion 88 which is adapted to extend through the access opening of the furnace into the combustion chamber and over the coal therein. The other end of the shaft 86 carries a suitable manual operator for permitting the overlying portion 88 to be raised. This manual operator may consist of a collar 89 which fits over the end of shaft 86, this collar receiving a handle portion 90 having a threaded end cooperating with threads in the collar for locking the collar in place on shaft 86. The handle portion 90 preferably extends outwardly from the control as shown. By pressing downwardly on the handle 90 the shaft 86 may be rotated so as to raise the overlying portion 88 upwardly, thus moving this portion out of the way so that it will not be injured when the attendant is working on the fire. Preferably means are provided for holding the overlying portion 88 in raised position while the access door 91 on the furnace is open. This means may comprise a latch member 92. This latch member is of general U-shaped construction, having legs 93 and 94 which are secured to pins 95 and 96 in turn secured to ears formed on the bracket 81. This latch member is provided with an operating portion 97 which extends outwardly from the control housing so as to be actuated by the access door 91. The latch member 92 is provided with a recess 98 which is adapted to receive a pin 99 which is secured to a collar 100. This collar extends between the ears 82 and 83 of the bracket 81 and surrounds the shaft 86. The collar 100 is also rigidly secured to the shaft 86 either by a driving fit or by suitable securing means. The latch member 92 is biased in a counterclockwise direction as seen in Fig. 4 by means of a spring 101, the fixed end of which is secured to the leg 77 of the U-shaped bracket 76. It will be apparent that when the access door 91 is closed the latch extension 97 will be engaged thereby, this pressing the extension inwardly against the action of spring 101 and retracting the latch recess 98 so that the pin 99 is free to move. When the access door 91 is open, however, the spring 101 is free to urge the latch member 92 to the position shown in dotted lines in Fig. 4. Consequently when the shaft 86 is rotated for raising the overlying portion 88, the pin moves downwardly until it is opposite the recess 98, at which time the spring 101 rocks the latch member so that the recess 98 slips over pin 99. Now when the handle portion 90 is released, the overlying portion 88 will be retained in its upper position as the upper surface of pin 99 will engage the upper surface of recess 98. The overlying portion 88 will thus be retained in its upper position until the access door 91 is closed, at which time the latch extension 97 is pressed inwardly, this rocking the edges of recess 98 away from pin 99, thereby releasing pin 99. The overlying portion 88 now drops by its own weight to its normal position wherein the pin 99 engages the top of the large slot 102 formed in the latch member. It will be noted that the pin 99 cooperates with the upper and lower surfaces of the large slot 102 in the latch member for providing limits of movement of shaft 86. Thus engagement of pins 99 with the top of the large slot determines the lower limit of movement for the overlying portion 88, while the pin 99 and the lower surface of slot 102 cooperate in determining the upper limit of movement of the overlying member 88.

The switch arm 51 is rocked about its pivot 73 by rotary movement of shaft 86. This result is obtained by means of a flexible arm 105 which is attached to a suitable bracket 105' formed on the lower portion 74 of the switch arm bracket 71. The left hand end of the flexible arm 105 is adapted to cooperate with spaced lugs 106 and 107 formed on a bracket 108 which is attached to the collar member 100.

From the foregoing description it will be apparent that when the stoker is in normal operation, the switch arm 51 will be in the position shown wherein fixed contacts 43 and 47 are bridged, which completes the circuit to the stoker motor. At this time the fire or fuel level in the combustion chamber is below the level of the overlying device 88, this level being determined by the engagement of pin 99 with the top surface slot 102. The access door at this time of course will be closed, which restrains the latch member 92 from rotation by spring 101. If the fire should go out, continued operation of the stoker will feed coal into the stoker retort, thus causing a rise in level of the coal in the fire pot. This rising coal will engage the overlying portion 88, thus urging it upwardly, this causing rotation of the shaft 86 for moving the lug 106 downwardly into engagement with the flexible arm 105. Due to the action of the permanent magnet 54 in attracting armature 53, the movable contacts will be held in engagement with the fixed contacts 43 and 47 until the lug 106 in deflecting the spring member 105 stores sufficient stress in this spring member to overcome the holding force of the magnet 54. At this time the switch arm 51 will move with snap action in a counter-clockwise direction about its pivot, thereby causing the stationary contacts 43 and 47 to become unbridged and causing the stationary contacts 61 and 62 to become bridged. Thus the stoker is placed out of operation and the alarm device 28 is energized. The device will remain in this position until the excess coal is removed from the fire pot.

When the attendant desires to remove clinkers from the fire or to rebuild the fire, he opens the access door 91, which releases the latch member 92. He also depresses the handle 90 downwardly, which causes the overlying member 88 to be raised a substantial distance from the fire and out of the way. During this movement, the lug 106 engages the flexible arm or spring blade 105 which causes movement of the switch arm 51 for unbridging the contacts 43 and 47, this stopping the stoker motor if it should happen to be running at this time. Also this downward movement of handle 90 results in downward movement of the pin 99 to a point where it coincides with the slot 98. Due to the latch member 92 now being released by the access door being open, the spring 101 rotates this latch member so as to cause slot 98 to retain the pin 99 in its lower position. Thus the overlying member 88 is retained in an out-of-the-way position and the circuit to the stoker motor is broken during the time that the attendant works on the fire. When the access door is closed it engages the actuating member 97 of the latch 92, thus moving this latch to a position in which the slot 98 releases pin 99, the overlying member 88 now dropping by its own weight to its lower position. At this time the lug 107 engages the flexible member 105 for urging the switch arm 51 in a clockwise direction about its pivot, this unbridging the stationary contacts 61 and 62 with snap action, and also bridging stationary contacts 43 and 47 with snap action. Thus closure of the access door automatically returns the control to operative position, deenergizing the alarm device 28 and permitting operation of the stoker motor.

Figs. 5, 6 and 7

Referring now to Figs. 5, 6 and 7, these figures illustrate a different embodiment of the invention. This device may consist of a base 110 which may be a cup-shaped stamping, this base receiving a cover 111. A shaft 112 extends through the sides 113 and 114 of the base, this shaft having its left hand end fitting into a collar member 115 which in turn fits in an enlarged opening 116 formed in the side 114 of the base. This collar member 115 receives a handle 117. The other end of the shaft 112 is bent to form an overlying member 119 which is adapted to extend inwardly through the access door of a furnace and overlie the fuel in the fire pot. This overlying member 119, if desired, may be provided with a suitable heat resisting cover 120 so as to prolong the life thereof. The collar member 115 also receives a stud 121 which may secure this member to shaft 112. The stud 121 also cooperates with a spring clip 122 for holding the overlying member in its raised position. It will be apparent that when the handle 117 is depressed for raising the overlying portion 119, the stud 121 will be rotated clockwise so as to engage the depression 123 formed in the spring clip 122. The overlying member 119 is thus held in its raised position until the handle portion 117 is pulled upwardly, this causing the spring clip 123 to yield and permit return movement of the member 119 to its normal position.

The shaft 112 near the center of base 110 carries a second collar member 124. This collar member is formed with a pair of abutments 125 and 126 which are adapted to engage the base 110 and form stops for limiting rotation of shaft 112. Thus the abutment 125 by engaging the base 110 limits counterclockwise rotation of the shaft 112 and consequently determines the lower or normal position of the overlying member 119 within the fire box. The abutment 126 in engaging the base determines the upper limit of movement of the overlying member 119. The side of the collar 124 which faces outwardly from the base is provided with a generally arcuate surface 127 for a purpose which will become apparent as this description proceeds. Located on each side of the collar 124 are spacing members 128 and 129. These members provide for proper spacing of legs 130 and 131 of a mercury switch carrier generally indicated as 132. This carrier may consist of a pair of U-shaped clamping members 133 and 134, the member 133 being formed with the leg 130, and the member 134 being formed with the leg 131, these legs being pivotally mounted on shaft 112 as shown. The mercury switch carrier 132 receives a mercury switch 136. This mercury switch at its left hand end carries a spring 137 which engages the arcuate surface 127 of the collar member 124, this providing a slip friction drive between shaft 112 and the mercury switch. The mercury switch 136 preferably is of the metallic casing type and extends through a slot 138 in the cover so that it may be operated manually. This switch is arranged with its electrodes at its left hand end, having leads 139 and 140 attached to suitable terminals 141 and 142 carried by a terminal bracket 143 which is mounted on the base 110 by screws 144 and spacers 145.

During normal operation of the stoker the overlying member 119 is not contacted by the coal in the fire pot and thus drops by its own weight to a normal position which is determined by the abutment 125 engaging base 110. The normal position of the mercury switch 136 is indicated by the upper dotted lines, this causing the mercury within the switch to bridge the switch electrodes for completing a circuit to the stoker motor. If the fire goes out, the coal level in the fire pot rises, this engaging the overlying member 119 and moving it upwardly, thus rotating the shaft 112 in a clockwise direction as seen in Fig. 5. This rotation of shaft 112 by engagement of the circular surface 127 of the collar member 124 with the spring 137 causes tilting of the mercury switch 136 so as to unbridge its electrodes and break the circuit to the stoker motor. The stoker motor thus remains out of operation until the fire is rekindled.

It will be noted that due to the slip friction drive for the mercury switch 136, this switch may be tilted independently of the position of the arm 119. The switch 136 thus may be used as a manual switch for preventing operation of the stoker, for example during the summer. The switch 136 may be also employed for preventing operation of the stoker when the fire is being given attention. Thus the attendant may either press the mercury switch to its lowermost position for stopping the stoker, or he may depress the handle 117 for raising the overlying portion 119 out of the way, this automatically shifting the switch 136 to its lower position by means of the slip friction drive above described. It should be noted that due to this slip friction drive, the mercury switch 136 is always returned to its upper position whenever the handle 117 is actuated for shifting the overlying member 119 downwardly toward normal position.

It will be apparent that by adjusting the collar member 124 on shaft 112 the lower or normal position of the member 119 may be varied for meeting the needs of different installations. Similarly by adjusting the collar member 115 on shaft 112 the upper position of member 119 may be varied to suit the needs of the particular installation.

Figs. 8, 9 and 10

Referring now to Figs. 8, 9 and 10, these figures show an embodiment of the invention wherein the control is mounted directly upon the access door of the furnace. In this device a base 150 of insulating material is mounted directly upon the access door 151, this base being provided with a cover 152. The control in this case may be wired from a junction box 153 secured to the furnace jacket by means of flexible BX cable 154, which permits opening and closing of the access door. The base 150 may be provided with a bracket 155 which carries a pivot pin for a switch operating arm 156 which is formed of insulating material. This arm at its lower end is attached to a movable contact bar 157 which is adapted selectively to bridge either a pair of fixed contacts 158 and 159 or a pair of fixed contacts 160 and 161. These stationary contacts are carried by suitable brackets mounted on base member 150 as shown. The switch operating arm 156 is provided at its upper end with a biasing spring 162, this biasing the arm 157 in a direction tending to bridge the stationary contacts 158 and 159.

The switch operating member 156 is also pivoted to an operating stem 163 which extends through coinciding openings in the base 150 and the access door 151. This operating stem is provided at its inner end with an adjusting screw 164 which is adapted to be engaged by a lever arm 165 of a bell crank member which is pivoted at 166 to a bracket mounted on the top of the access door frame. This bell crank member includes an overlying member 167 which overlies the coal in the combustion chamber. The bell crank member is also provided with a stop member 168 which is adapted to engage the bracket for pivot 166 and thus determine the normal position of the member 167 in the combustion chamber. If desired, the stop member 168 may be made adjustable by means of a suitable adjusting screw.

The adjusting screw 164 on the stem 163 is adjusted so that when the access door 151 is closed and the bell crank member is in its normal position as shown, the screw 164 will engage the lever arm 165 for urging the switch operating member 156 in a clockwise direction sufficiently to bridge the stationary contacts 160 and 161. This, as shown in Fig. 9, completes the circuit from wire 170 to wire 172 for permitting operation of the stoker motor 173.

If the fire should go out the fuel level in the fire pot will rise, thus causing the fuel to engage the overlying member 167, rotating it clockwise about pivot 166 and retracting the lever arm 165 from engagement with adjusting screw 164. This will permit the spring 162 to rotate the switch operating arm 156 in a counter-clockwise direction, thus unbridging the stationary contacts 160 and 161 for placing the stoker out of operation. This will also result in bridging of contacts 158 and 159 for energizing the alarm device 174. While a suitable snap action means has not been shown for sake of clearness in this embodiment of the invention, it is preferable in actual practice to provide such means, for example as shown in Fig. 1.

It will be apparent that when the access door is opened the adjusting screw 164 on the stem 163 is retracted from engagement with the lever arm 165. This permits the spring 162 to rock the switch operating member 156 for stopping the stoker motor. When the access door is moved back to closed position the adjusting screw 164 will again engage lever arm 165 whereby to rock the switch operating member 156 toward normal position for permitting stoker operation.

From the foregoing description it will be apparent that the present invention provides an outfire control for stokers which is simple in construction and positive in operation, this control stopping the stoker only when the fire is actually out and always stopping the stoker at such time. It will be further apparent that the present invention provides an arrangement by which the outfire control serves to stop the stoker when the fire is being given attention, the stoker being automatically conditioned for operation when the access door is closed. While only a few possible embodiments of the invention have been illustrated, it will be apparent that many changes may be made by those skilled in the art without departing from the scope of the invention. In addition, while the invention is primarily intended for control of stokers, it will be apparent that certain features are of broader application. It is therefore desired to be limited only by the scope of the appended claims.

What is claimed is:

1. In a control system for a heating system having a stoker mechanism including fuel feeding means for feeding solid fuel to a combustion chamber and air feeding means for feeding air to the combustion chamber, the combination of, means responsive to the demand for heat from the stoker mechanism for placing at least one of the feeding means into and out of operation, means including a controller for controlling at least the other of said feeding means, an access door for the combustion chamber for permitting manual tending of the fire, movable member means extending from said controller and overlying the fuel in the combustion chamber, said movable member means actuating said controller in accordance with the height of the fuel in the furnace, and means for shifting said movable member means to a position in which it does not interfere with manual tending of the fire when the access door is open.

2. In a control system for a heating system having a stoker mechanism including fuel feeding means for feeding solid fuel to a combustion chamber and air feeding means for feeding air to the combustion chamber, the combination of, means responsive to the demand for heat from the stoker mechanism for placing at least one of the feeding means into and out of operation, means including a controller for controlling at least the other of said feeding means, an access door for the combustion chamber for permitting manual tending of the fire, movable member means extending from said controller and overlying the fuel in the combustion chamber, said movable member means being constructed and arranged so as to be urged upwardly by the fuel and when raised above a predetermined level actuating said controller to stop the feeding means controlled thereby, and means independent of the fuel for moving said movable member means upwardly to at least said predetermined level and holding said movable member means in such position when the access door is open.

3. In a control system for a heating system having a stoker mechanism including fuel feeding means for feeding solid fuel to a combustion chamber and air feeding means for feeding air to the combustion chamber, the combination of, a room thermostat responsive to the demand for heat from the stoker mechanism for placing at least one of said feeding means into and out of operation, an access door for the combustion chamber, a switch for controlling the stoker mechanism, means for actuating said switch from one position to another for stopping a portion of the stoker mechanism, and means actuated by closure of the access door for causing said switch to return to said one position.

4. In a control system for a heating system having a stoker mechanism including fuel feeding means for feeding solid fuel to a combustion chamber, the combination of, means responsive to the demand for heat from the stoker mechanism for placing the fuel feeding means into and out of operation, means including a switch having a first position in which the fuel feeding means is rendered operative under the control of said responsive means and a second position in which the fuel feeding means is prevented from operating, a member overlying the fuel in the combustion chamber for moving the switch from its first position to its second position when the fuel rises to a height indicating the fire is probably out, an access door for the furnace, manual means for raising said member, latch means for holding said member in its raised position and means actuated upon closure of said access door for releasing said latch means.

5. In a control system for a heating system having a stoker mechanism including fuel feeding means for feeding solid fuel to a combustion chamber, the combination of, means including a controller having a first position in which the fuel feeding means is rendered operative and a second position in which the fuel feeding means is prevented from operating, a member overlying the fuel in the combustion chamber for moving the controller from its first position to its second position when the fuel rises to a predetermined height, and means including a manually operable controller for moving said member and placing said first mentioned controller in its second position to render the fuel feeding means inoperative.

6. In a control system for a heating system having a stoker mechanism including fuel feeding means for feeding solid fuel to a combustion chamber, the combination of, means including a controller having a first position in which the fuel feeding means is rendered operative and a second position in which the fuel feeding means is prevented from operating, a member overlying the fuel in the combustion chamber for moving the controller from its first position to its second position when the fuel rises to a predetermined height, an access door for the combustion chamber, means for moving said member to place the controller in its second position when the access door is opened thereby permitting access to the combustion chamber with the fuel feeding means in nonoperative condition, and means operable by closure of said access door to place the controller in said first position.

7. In a control system for a heating system having a stoker mechanism including fuel feeding means for feeding solid fuel to a combustion chamber, the combination of, means responsive to the demand for heat from the stoker mechanism for placing the fuel feeding means into and out of operation, means including a controller having a first position in which the fuel feeding means is rendered operative under the control of said responsive means and a second position in which the fuel feeding means is prevented from operating, a member overlying the fuel in the combustion chamber for moving the controller from its first position to its second position when the fuel rises to a height indicating the fire is probably out, and means for moving said controller to either its first or second positions irrespective of the position of said overlying member.

8. In a control system for a heating system having a stoker mechanism including fuel feeding means for feeding solid fuel to a combustion chamber, the combination of, means responsive to the demand for heat from the stoker mechanism for placing the fuel feeding means into and out of operation, means including a controller having a first position in which the fuel feeding means is rendered operative under the control of said responsive means and a second position in which the fuel feeding means is prevented from operation, a member mounted on the wall of the combustion chamber and overlying the fuel in said chamber, an access door for the combustion chamber, said controller being mounted on said access door, motion transmitting means placing said member in control of said controller when the access door is closed while causing movement of said controller to its second position irrespective of said member when the access door is open, said motion transmitting means being constructed and arranged to cause movement of the controller to its second position when the access door is closed and the member is moved by the fuel to a position indicating the fire is probably out.

9. In a control system for a heating system having a stoker mechanism including fuel feeding means for feeding solid fuel to a combustion chamber, the combination of, means responsive to the demand for heat from the stoker mechanism for placing the fuel feeding means into and out of operation, means including a controller having a first position in which the fuel feeding means is rendered operative under the control of said responsive means and a second position in which the fuel feeding means is prevented from operating, an access door for the combustion chamber, said controller being mounted on the access door, and movable member means extending from said controller through the access door and overlying the fuel in the combustion chamber, said movable member means being constructed and arranged to move the controller from its first position to its second position when the fuel rises to a height indicating that the fire is probably out.

HOMER E. MALONE.